(12) United States Patent
Edwards et al.

(10) Patent No.: US 12,432,539 B2
(45) Date of Patent: Sep. 30, 2025

(54) ALERT A USER OF A WEATHER CHANGE

(71) Applicant: Capital One Services, LLC, McLean, VA (US)

(72) Inventors: Joshua Edwards, Philadelphia, PA (US); Ashley Zywusko, Falls Church, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 363 days.

(21) Appl. No.: 17/957,244

(22) Filed: Sep. 30, 2022

(65) Prior Publication Data
US 2024/0114327 A1 Apr. 4, 2024

(51) Int. Cl.
| | |
|---|---|
| *H04W 4/90* | (2018.01) |
| *G01W 1/02* | (2006.01) |
| *G01W 1/10* | (2006.01) |
| *H04W 4/02* | (2018.01) |
| *H04W 4/021* | (2018.01) |
| *H04W 4/12* | (2009.01) |

(52) U.S. Cl.
CPC ............... *H04W 4/90* (2018.02); *G01W 1/02* (2013.01); *G01W 1/10* (2013.01); *H04W 4/021* (2013.01); *H04W 4/027* (2013.01); *H04W 4/12* (2013.01); *G01W 2203/00* (2013.01)

(58) Field of Classification Search
CPC ....... H04W 4/90; H04W 4/021; H04W 4/027; H04W 4/12; G01W 1/02; G01W 1/10; G01W 2203/00

USPC ........................................................ 455/404.2
See application file for complete search history.

(56) References Cited

U.S. PATENT DOCUMENTS

| | | | |
|---|---|---|---|
| 6,317,686 B1 * | 11/2001 | Ran .................... | G08G 1/0141 |
| | | | 73/178 R |
| 8,406,162 B2 * | 3/2013 | Haupt ................... | H04L 67/52 |
| | | | 370/324 |
| 9,922,350 B2 | 3/2018 | Smith | |
| 9,933,548 B1 * | 4/2018 | Stenneth ............... | G01W 1/10 |
| 10,405,044 B1 | 9/2019 | Seely et al. | |
| 10,687,273 B1 | 6/2020 | Varma et al. | |
| 10,964,082 B2 * | 3/2021 | Amitay .................. | G06T 13/60 |
| 2001/0030624 A1 * | 10/2001 | Schwoegler ........... | G01W 1/10 |
| | | | 342/357.52 |
| 2006/0267783 A1 * | 11/2006 | Smith .................... | G01W 1/00 |
| | | | 340/601 |
| 2009/0109059 A1 * | 4/2009 | Mizuno ............... | G01C 21/3694 |
| | | | 340/905 |

(Continued)

*Primary Examiner* — Jean A Gelin
(74) *Attorney, Agent, or Firm* — Sterne, Kessler, Goldstein & Fox P.L.L.C.

(57) ABSTRACT

Disclosed herein are system, method, and computer program product embodiments for generating an alert to a user for a change between weather conditions. An application can be operated by a processor to perform operations include determining a first weather condition at a geographic location at a first time when a user of the device enters a structure located within the geographic location. In addition, the operations can include, based on information received from the server, predicting a second weather condition at the geographic location at a second time while the user remains in the structure. Afterwards, the operations can include alerting the user for a change between the first and second weather conditions.

20 Claims, 5 Drawing Sheets

(56) References Cited

U.S. PATENT DOCUMENTS

| | | | |
|---|---|---|---|
| 2011/0054776 A1* | 3/2011 | Petrov | G01C 21/3694 |
| | | | 715/764 |
| 2012/0062392 A1* | 3/2012 | Ferrick | G08G 1/096741 |
| | | | 340/905 |
| 2013/0029587 A1* | 1/2013 | Gandhi | H04W 16/20 |
| | | | 455/7 |
| 2014/0156410 A1 | 6/2014 | Wuersch et al. | |
| 2014/0342688 A1* | 11/2014 | Cornett | H04W 4/90 |
| | | | 455/404.2 |
| 2015/0074275 A1* | 3/2015 | Ashley | G06F 16/22 |
| | | | 709/226 |
| 2015/0127263 A1* | 5/2015 | Praun | H04L 51/046 |
| | | | 702/3 |
| 2015/0256277 A1* | 9/2015 | Johnson | G08B 27/006 |
| | | | 340/601 |
| 2016/0018283 A1* | 1/2016 | Fleury | H01Q 1/42 |
| | | | 73/40.5 R |
| 2018/0231685 A1* | 8/2018 | Rainey | G06Q 10/0635 |
| 2018/0283895 A1* | 10/2018 | Aikin | G01C 21/3415 |
| 2022/0051765 A1* | 2/2022 | Wang | G16H 20/70 |
| 2022/0153258 A1* | 5/2022 | Arechiga-Gonzalez | |
| | | | G08G 1/147 |
| 2022/0357480 A1* | 11/2022 | Spagnuolo Sobrinho | |
| | | | G01W 1/10 |
| 2022/0391070 A1* | 12/2022 | Crandall | G01W 1/00 |

* cited by examiner

ALERT A USER OF A WEATHER CHANGE

BACKGROUND

When one is out of their home for an event, e.g., traveling, shopping, etc., weather can dictate how to most effectively schedule pre, during, and post event activity. For example, knowing how weather will change during an event may, in turn, change how one approaches the event in order to reduce the impact of the weather on pre, during, and post event activity.

BRIEF SUMMARY

There is a need to be able to most accurately be alerted of weather changes that may affect behavior during an activity. For example, if one travels to a shopping event either in public or private transportation and weather will become bad during the shopping event, being alerted to the changing weather activity to gauge how fast one needs to shop can be very important.

Disclosed herein are system, apparatus, device, method and/or computer program product embodiments, and/or combinations and sub-combinations thereof, for generating an alert to a user for a change between weather conditions. Embodiments herein generate an alert for a user in a structure, such as a shopping mall, about a weather change based on information about a first weather condition at a geographic location at a first time and a predicted second weather condition at the same geographic location at a second time in the near future while the user remains in the structure.

In some embodiments, a device can include a transceiver configured to wirelessly communicate with a server and a processor coupled to the transceiver. An application can be operated by the processor and be configured to perform operations that generate an alert for a user of a change between weather conditions. The operations can include determining a first weather condition at a geographic location at a first time when a user of the device enters a structure located within the geographic location. The operations can include, based on information received from the server, predicting a second weather condition at the geographic location at a second time while the user remains in the structure. The operations can include alerting the user to a change between the first and second weather conditions.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Accurate and timely weather forecasting is important in everyday life. Current weather forecasting performed on television or by an application software operated on a device often predict a weather condition at a geographic location at a future time instance. In that case, a user is required to actively monitor weather conditions using an application software or watching television weather forecasting.

In certain geographic locations, weather can change quickly. In some situations, when a user is in a structure, such as a large retail establishment, e.g., a big box store or an indoor mall, the user does not know about changing weather conditions outside. It is impractical for the user to take actions to keep monitoring the weather frequently. Without knowing the weather outside the structure, by the time the user completes the shopping and becomes aware of an adverse weather outside the structure, it may be too late for the user to change behavior to address the changing weather situation. Accordingly, the user may encounter a less than desirable weather situation when exiting the structure. For example, the user may be forced to run through the rain with merchandise purchased in the mall.

Some embodiments herein provide techniques that can proactively alert the user of the changes of weather conditions, which can further allow the user to adjust their behavior during the shopping experience. In some aspects, an alert may lead to higher sales for the stores in the mall when users spend more time in the store to buy merchandises after being alerted to adverse weather outside the structure.

Some embodiments herein provide techniques that can proactively alert the user of the changes of weather conditions, which are different from some existing application software that merely provides weather prediction or forecasting for a future time instance instead for a change between weather conditions at multiple time instances.

Some application software may merely provide forecasting for a future time instance, which can be less useful since the user may not remember to take frequent action to check the weather forecast using the application software. Other application software may merely send notifications of weather conditions to the user, which can generate too many notifications and interrupt the user's normal activities.

Some embodiments herein generate an alert to a user for a change between weather conditions based on information about a first weather condition at a geographic location at a first time and a predicted second weather condition at the same geographic location at a second time in the near future. In some aspects, no user alert is generated if there is no change to the weather conditions. Hence, the user may avoid unwanted alerts when there is no change in the weather conditions.

Some embodiments herein can be particularly useful when the user is in a structure, such as a shopping mall, and has no information about the possible incoming weather changes.

Figure 1A:
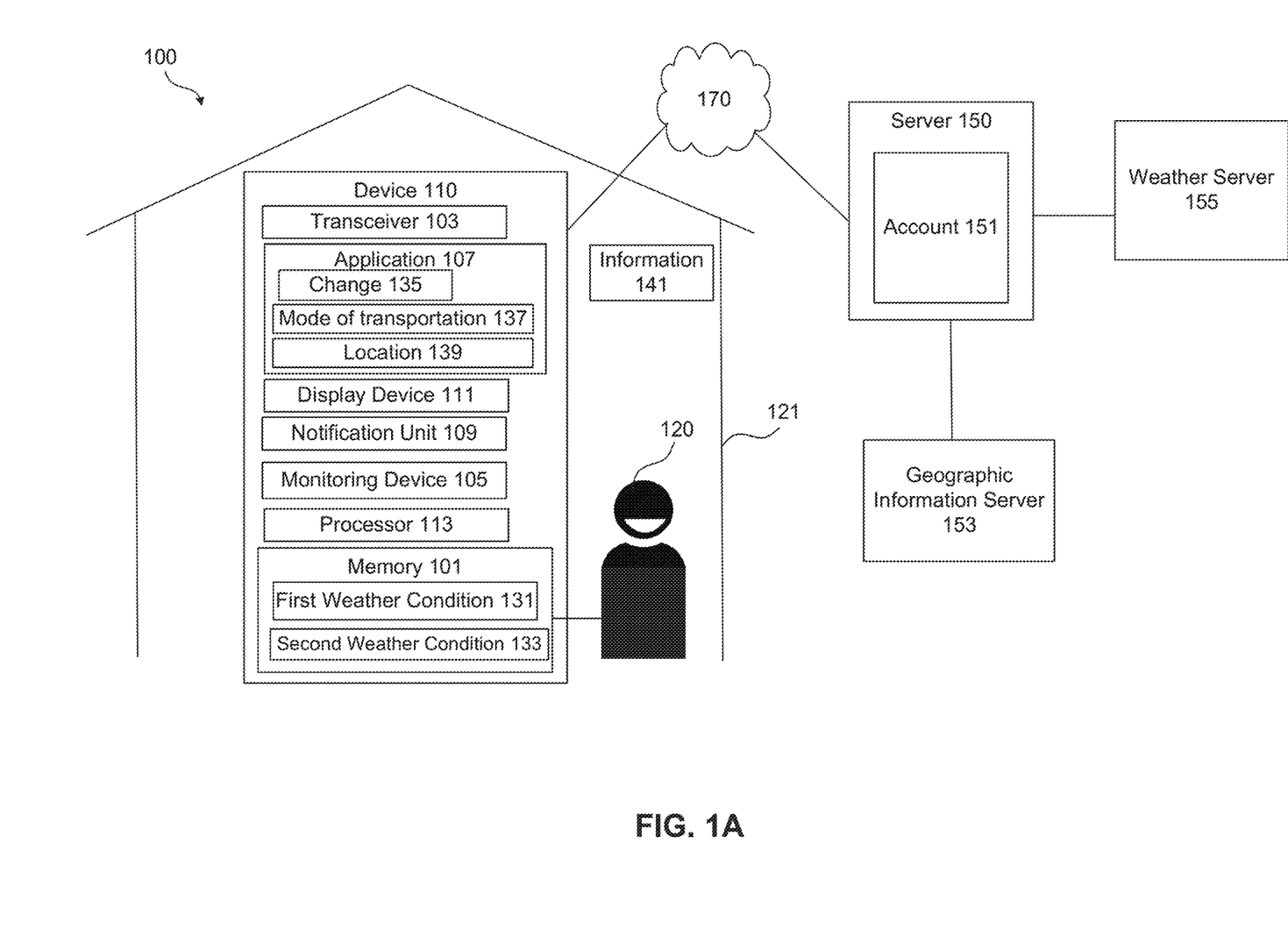
FIGS. 1A-1B show block diagrams of a system for generating an alert to a user for a change between weather conditions, according to some embodiments.
Figure 1B:
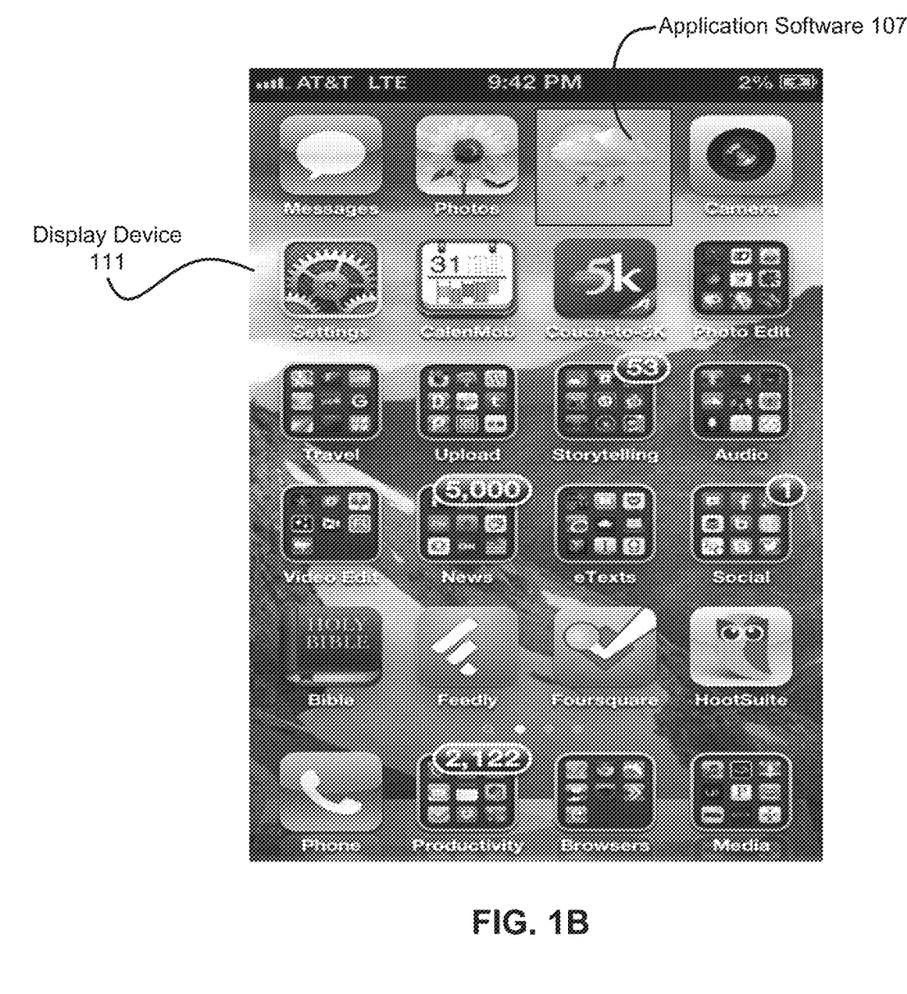

FIGS. 1A-1B show block diagrams of a system 100 according to some embodiments. For example, system 100 may be used for generating an alert to a user for a change between weather conditions at first and second times. It is to be understood that there may be more or fewer components included in system 100. Further, it is to be understood that one or more of the devices and components within system 100 may include additional and/or varying features from the description below, and may include any devices and components that one having ordinary skill in the art would consider and/or refer to as generating an alert to a user for a change between weather conditions.

In some embodiments, as shown in FIG. 1A, system 100 can include a device 110 and a server 150 operatively coupled to each other through a network 170. Device 110 can include a memory 101, a processor 113, a transceiver 103, and a display device 111, coupled to each other. Various modules, which can be implemented as hardware, software, or a combination of hardware and software, can be operated on device 110, such as a monitoring device 105, an application software 107, a notification unit 109, etc.

Monitoring device 105 can be implemented by hardware, software, or a combination of hardware and software to provide various monitored information such as a location 139.

Notification unit 109 can be a sound notification unit to generate a sound notification, a haptic notification unit to generate a haptic movement, or any other notification type.

In some embodiments, network 170 can be a "computer network" or a "communication network," which terms are used interchangeably. In some examples, network 170 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, server 150 can include a server device (e.g., a host server, a web server, an application server, etc.), a data center device, or a similar device. Server 150 can include a processor, an operating system, server applications operated by the processor, and a storage device coupled to the processor. The processor of server 150 can include one or more central processing units (CPUs), and a programmable device (such as a hardware accelerator or a FPGA).

In some embodiments, device 110 can be any computing device, a wireless communication device, a smart phone, a laptop, a tablet, a personal assistant, a monitor, a wearable device, an Internet of Thing (IoT) device, a mobile station, a subscriber station, a remote terminal, a wireless terminal, a video camera, an instrument, or any other user device. Device 110 can also be configured to operate based on a wide variety of wireless communication techniques. These techniques can include, but are not limited to, techniques based on 3rd Generation Partnership Project (3GPP) standards.

In some embodiments, application software 107 can be in communication with server 150 to receive information 141 from server 150. As shown in FIG. 1B, application software 107 can be a software specifically used for weather forecasting or information, which is displayed as an icon on display device 111. In some other embodiments, application software 107 can be a financial software, a personal software, a health care software, a social media software, a government service software, or any other software. For example, application software 107 can be a financial software so that user 120 can access account 151 maintained on server 150. Application software 107 can be referred to as an application as well.

Figure 2:
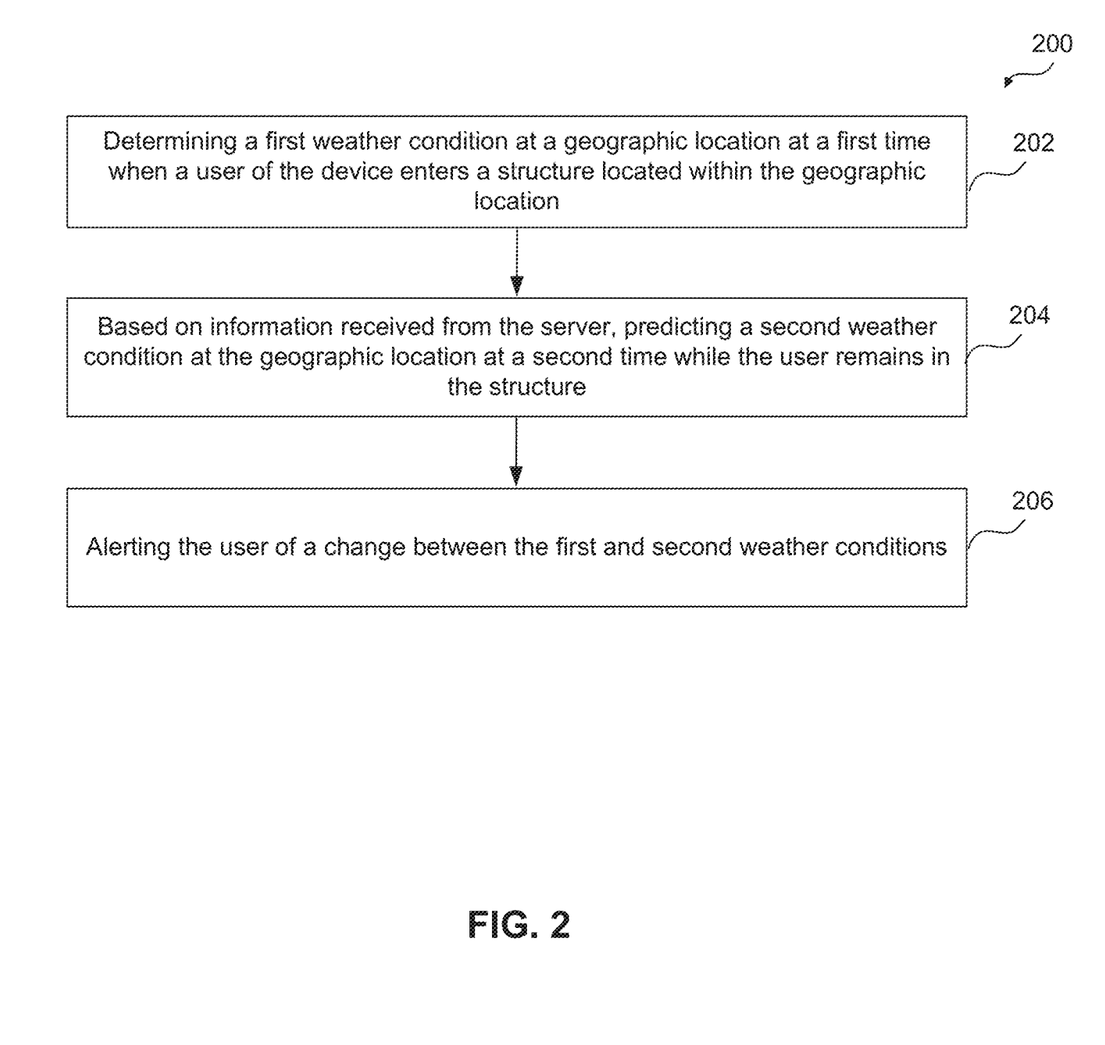
FIGS. 2-3 illustrate example processes for generating an alert to a user for a change between weather conditions, according to some embodiments.
Figure 3:
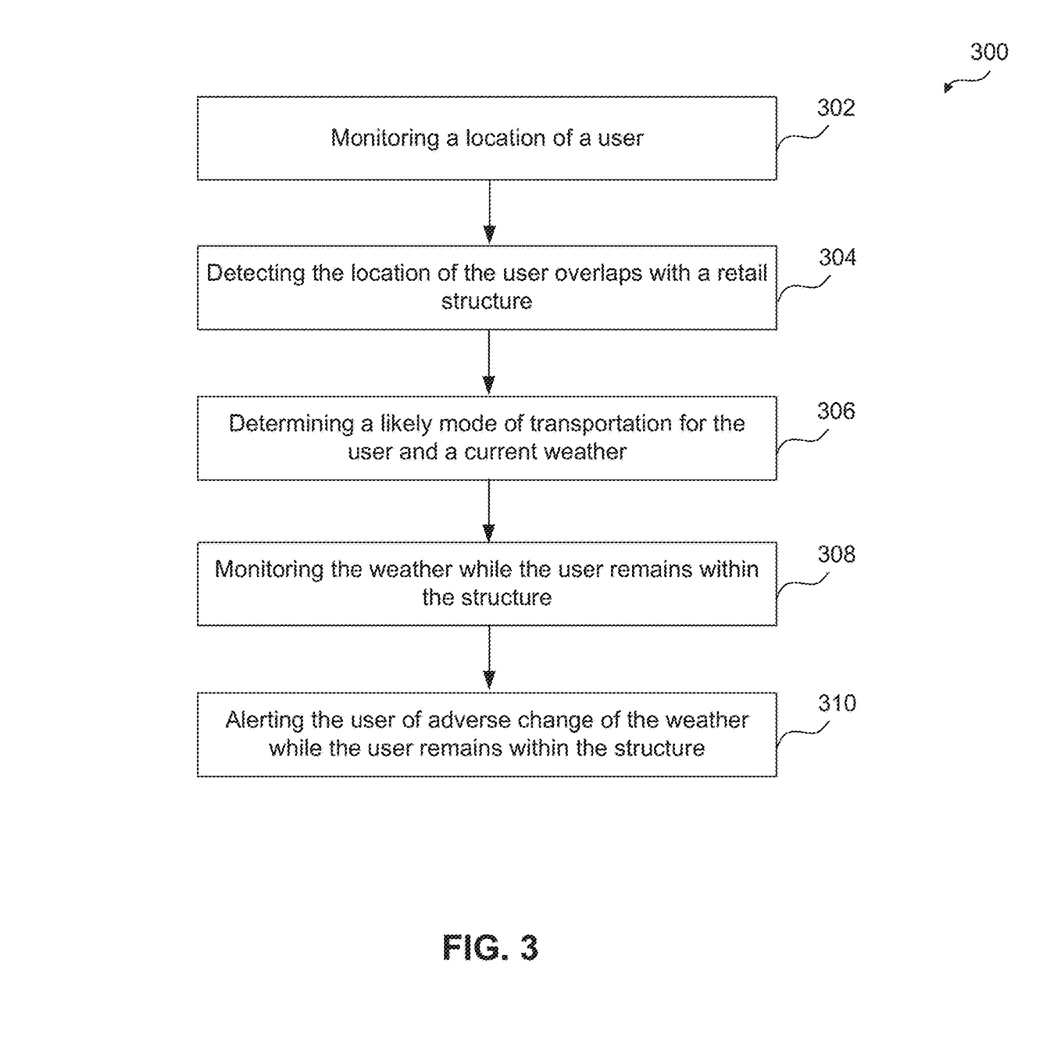

In some embodiments, application software 107 can be operated by processor 103 to perform various operations, such as operations illustrated in processes 200 as shown in FIG. 2, or in processes 300 as shown in FIG. 3. In some embodiments, process 200 and process 300 can be performed by processing logic of device 110 that can comprise hardware (e.g., circuitry, dedicated logic, programmable logic, microcode, etc.) to operate software application software 107 (e.g., instructions executing on a processing device).

It is to be appreciated that not all steps may be needed to perform the disclosure provided herein. Further, some of the steps may be optionally performed or performed simultaneously, or in a different order than shown in FIGS. 2-3, as will be understood by a person of ordinary skill in the art.

In one aspect, at operation 202, application software 107 can determine a first weather condition 131 at a geographic location at a first time when user 120 of device 110 enters a structure 121 located within the geographic location. The first weather condition 131 can include temperature, precipitation, wind speed, a potential disaster warning such as tornado, hurricane, hail, lightning storms, torrential downpours, and other conditions of interests in the geographic location. For example, the first weather condition 131 may include precipitation 12%, humidity 100%, wind 4 mph. The first weather condition 131 can be saved in memory 101.

In some embodiments, application software 107 can detect location 139 of user 120 of device 110 before user 120 enters structure 121. In some embodiments, the location of user 120 can be determined by monitoring device 105. In some embodiments, monitoring device 105 can be a device included within device 110 based on global positioning system (GPS) or other location tracking systems. Monitoring device 105 can provide location 139 to application software 107. In some other embodiments, monitoring device 105 can store location 139 in memory 101 so that application software 107 can access memory 101 to retrieve location 139.

In some embodiments, application software 107 can further determine that user 120 enters structure 121 based on an overlap of location 139 of user 120 and a structure location for structure 121. Application software 107 may receive from server 150 the structure location for structure 121. In some embodiments, server 150 may request and further receive the structure location for structure 121 from another server, geographic information server 153. There can be various different implementations for application software 107 to determine that user 120 enters structure 121. In some other embodiments, application software 107 may provide location 139 of user 120 to server 150 so that server 150 can make such a determination that user 120 enters structure 121. Afterwards, server 150 can send such a determination as a part of information 141 to application software 107.

In some embodiments, after application software 107 determines that user 120 enters structure 121, application software 107 can determine first weather condition 131 at the geographic location at the first time when user 120 of device 110 enters a structure 121. In some embodiments, application software 107 may request from server 150 the first weather condition 131 at the geographic location at the first time. Server 150 may further request the first weather condition 131 from a weather server 155.

In some other embodiments, server 150 may send the first weather condition 131 to application software 107 based on its own determination. Server 150 may send periodic weather conditions to device 110 to be saved in memory 101. Application software 107 can access memory 101 to retrieve the most recently received weather condition as the first weather condition 131.

In one aspect, at operation 204, based on information 141 received from server 150, application software 107 can predict or determine a second weather condition 133 at the geographic location 129 at a second time while the user remains in the structure 121. The second weather condition 133 may include potential heavy rain, but the heavy rain may stop in a short time, e.g., within 20 minutes.

In some embodiments, the first and second times can be separated by a predetermined time interval, such as about 5 minutes, 10 minutes, 15 minutes, 30 minutes, or any other predetermined time interval determined based on historical data of weather changes in the geographic location. The first time and second time may be referred to as a first time instance and a second time instance.

In some embodiments, application software 107 may send a request to server 150 for second weather condition 133, and receive second weather condition 133 contained in information 141.

In some other embodiments, server 150 may periodically send weather conditions to device 110 to be saved in memory 101. And application software 107 can access memory 101 to retrieve a weather condition received closest to the second time as the second weather condition 133.

In one aspect, at operation 206, application software 107 can alert the user to a change 135 between first weather condition 131 and second weather condition 133. In some embodiments, the first weather condition 131 and the second weather condition 133 may be substantially the same if the weather condition in the geographic location does not change within a short period of time, such as about 30 minutes. If the first weather condition 131 and the second weather condition 133 are substantially the same, no alert may be generated to user 120.

In some embodiments, when a change 135 is detected between the first weather condition 131 and the second weather condition 133, application software 107 can generate an alert or notification to alert user 120 of the change between the first and second weather conditions. The notification to user 120 can be a text message to inform user 120 of the predicted change 135. In some embodiments, notification to user 120 can be generated by notification unit 109, which can include a sound or a movement of device 110 to alert the user 120.

In some embodiments, a difference between the first weather condition 131 and the second weather condition 133 may be qualified as change 135 based on a predetermined standard. When a difference between a temperature of the first weather condition 131 and a temperature of the second weather condition 133 is less than a first threshold, such as 1° F. or 1° C., the first weather condition 131 and the second weather condition 133 may still be deemed to be the same, and no change 135 is generated. In some embodiments, when a difference between a temperature of the first weather condition 131 and a temperature of the second weather condition 133 is more than a second threshold, such as 5° F.

or 5° C., change 135 may be generated to indicate a change between the first weather condition 131 and the second weather condition 133.

In some embodiments, application software 107 can detect a mode of transportation 137 for user 120. For example, application software 107 can monitor a speed or a route of user 120 by tracking one or more locations of user 120 immediately before arriving at a structure 121. For example, monitoring device 105 may periodically detect the location of user 120 before user 120 enters structure 121 to gather multiple locations of user 120 at multiple time instances. Based on the time difference between two time instances, and the distance between the two locations, monitor device 105 or application software 107 can detect the speed of user 120.

In some embodiments, multiple locations of user 120 can be used to determine a route of user 120. If the route determined based on multiple locations of user 120 overlaps with a bus or train route, and the speed of user 120 is also in the range of a bus or train speed, application software 107 may determine user 120 may have taken a bus or train to arrive at structure 121. Accordingly, mode of transportation 137 for user 120 may be a public transportation mode.

In some embodiments, a bike mode or a walk mode for user 120 can be detected based on the speed of user 120 determined from multiple locations of user 120 detected by monitoring device 105. In some embodiments, a ride sharing mode or a private vehicle mode can be determined by the speed of user 120, and stop pattern of user 120.

In some embodiments, change 135 can be generated when the second weather condition 133 represents an adverse change to the first weather condition 131 based on a mode of transportation 137 for user 120.

In some embodiments, application software 107 may only generate an alert to user 120 when the difference between the first weather condition 131 and the second weather condition 133 may be an adverse change based on mode of transportation 137.

In some embodiments, when mode of transportation 137 is a private vehicle mode indicating user 120 may have arrived at structure 121 by a private vehicle controlled by user 120, there may not be any alert to be generated for user 120 except extreme weather changes, e.g., tornado warnings, since any other changes, such as rain, may not make any difference to user 120.

In some other embodiments, when mode of transportation 137 is a bike mode or a walk mode for user 120 indicating user 120 may have arrived at structure 121 by a bike or by foot, change 135 indicating a potential raining condition may be generated to alert user 120 so that user 120 may change the behavior within the structure 121. For example, if user 120 arrives at structure 121 by a bike or by foot, once user 120 receives an alert that the weather is going to change to rain soon, user 120 may stay in structure 121, which may be a shopping mall, for a longer time to wait out the rain.

In some other embodiments, instead of being a standalone weather forecasting related software, application software 107 can be a financial software, a personal software, a health care software, a social media software, a government service software, or any other software. For example, application software 107 can be a financial software so that user 120 can access account 151 maintained on server 150. Accordingly, application software 107 can further be configured to perform operations comprising a financial operation related to a financial account of the user, the financial account being managed by a financial institution. The functions performed by application software 107 for generating an alert to a user for a change between weather conditions may be an added function of a conventional financial software, personal software, or some other software. There can be various implementations to implement functions described herein for generating an alert to a user for a change between weather conditions.

In some embodiments, operations in process 300 shown in FIG. 3 may be implemented as an example for the operations in process 200.

In one aspect, at operation 302, device 110 or application software 107 can monitor location 139 of user 120. In some embodiments, the location of user 120 can be determined by monitoring device 105. Monitoring device 105 can store location 139 in memory 101 so that application software 107 can access memory 101 to retrieve location 139.

In one aspect, at operation 304, application software 107 can detect location 139 of user 120 overlaps with a retail structure, such as structure 121. Application software 107 may receive from server 150 the structure location for structure 121. In some embodiments, server 150 may request and further receive the structure location for structure 121 from another server, geographic information server 153. In some embodiments, by tracking the location of user 120 using device 110, and cross-referencing with geographic information about where various stores are located, application software 107 can detect when user 120 enters a store, when user 120 leaves store, and when user 120 remains at the store.

In one aspect, at operation 306, application software 107 can determine a likely mode of transportation for the user and a current weather at a time when user 120 of device 110 enters structure 121 located within the geographic location. In some embodiments, application software 107 can detect mode of transportation 137 for user 120 based on a speed or a route of travel of user 120 determined by one or more locations of user 120 detected by device 110 or monitoring device 105 during travel to structure 121. Monitoring device 105 may periodically detect the location of user 120 before user 120 enters structure 121 to gather multiple locations of user 120 at multiple time instances. In some embodiments, mode of transportation 137 for user 120 can be based on cross-referencing with information such as public transit routes.

In one aspect, at operation 308, device 110 or application software 107 can monitor the weather while user 120 remains within structure 121, such as to predict the second weather condition 133 at the geographic location at a second time while the user remains in the structure. The second time may be at the immediate future, such as within 30 minutes of the first weather condition 131. Operations performed at 308 may be examples of operations performed at 204. Application software 107 may send a request to server 150 for the second weather condition 133, and receive the second weather condition 133 contained in information 141. In some other embodiments, server 150 may periodically send weather conditions to device 110 to be saved in memory 101. And application software 107 can access memory 101 to retrieve a weather condition received most close to the second time as the second weather condition 133.

In one aspect, at operation 310, device 110 or application software 107 can alert user 120 of adverse change 135 of the weather while user 120 remains within structure 121. In some embodiments, change 135 is generated when the second weather condition 133 represents an adverse change to the first weather condition 131 based on mode of transportation 137 for user 120. User 120 may change behavior based on the alert of adverse change 135. In some embodiments, if the alert indicates an incoming heavy rain, but the rain will stop within 20 minutes, user 120 may decide to stay within structure 121 for some additional time to continue shopping. In some embodiments, if the alert indicates an incoming heavy rain, which may last for a long time, user 120 may decide to stop shopping in structure 121, and buy an umbrella to go back home instead.

Figure 4:
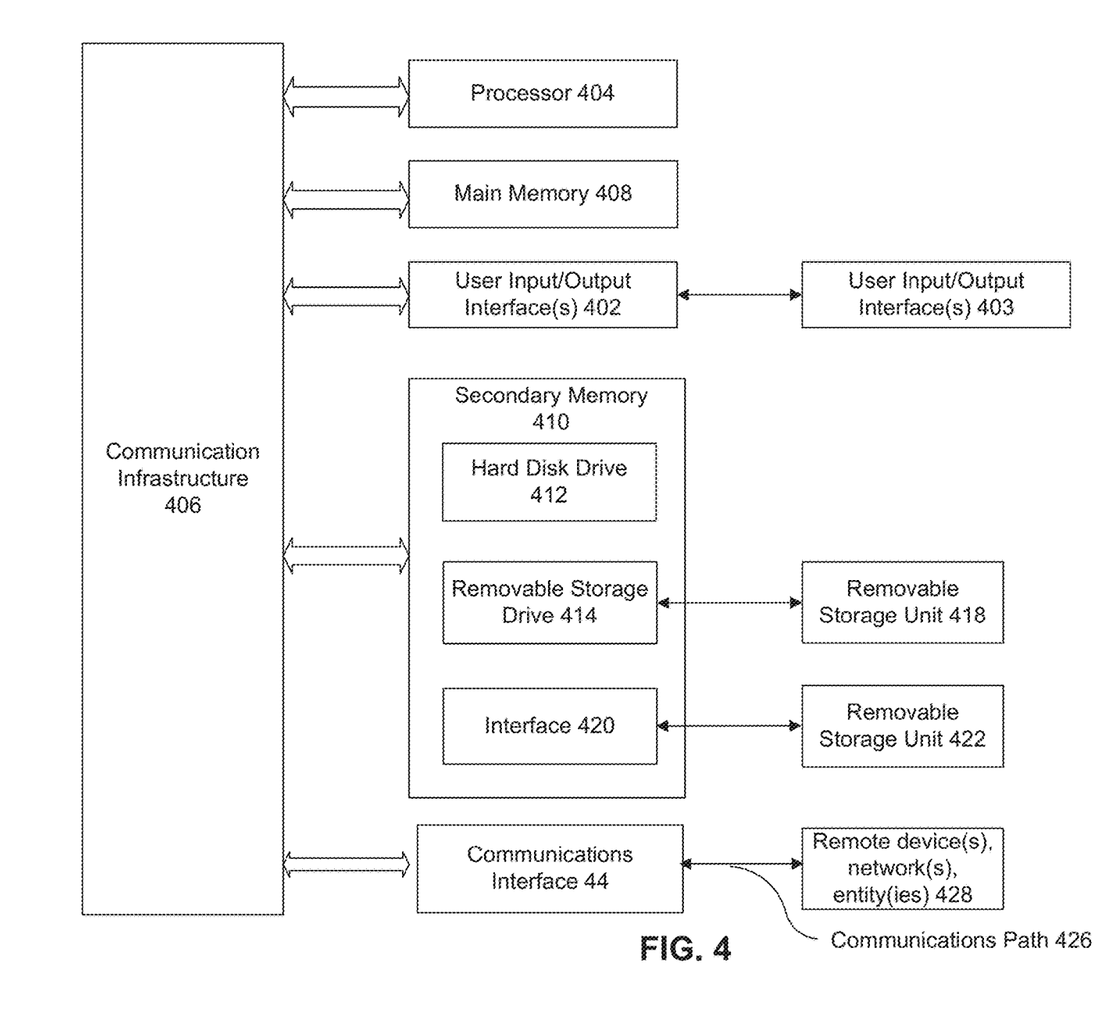
FIG. 4 is an example computer system useful for implementing various embodiments.

FIG. 4 shows a computer system 400, according to some embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. In some examples, computer system 400 can be used to implement device 110, or server 150 as shown in FIG. 1A, or operations shown in FIGS. 2-3. Computer system 400 may include one or more processors (also called central processing units, or CPUs), such as a processor 404. Processor 404 may be connected to a communication infrastructure or bus 406.

Computer system 400 may also include user input/output device(s) 403, such as camera 433, display devices, monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein. For example, control logic may cause processor 404 to perform operations shown in FIGS. 2-3.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present description as contemplated by the inventor(s), and thus, are not intended to limit the present description and the appended claims in any way.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A device, comprising:
a transceiver to wirelessly communicate with a server;
a processor coupled to the transceiver; and
an application operated by the processor and the application configured to perform operations comprising:
determining a first weather condition at a geographic location at a first time when a user of the device enters a building located within the geographic location;
based on information received from the server, predicting a second weather condition at the geographic location at a second time while the user remains in the building; and
alerting the user of a change between the first and second weather conditions.

2. The device of claim 1, wherein the second weather condition represents an adverse change to the first weather condition based on a mode of transportation for the user.

3. The device of claim 1, wherein the application is configured to perform operations further comprising:
detecting a location of the user of the device before the user enters the building; and
determining that the user enters the building based on an overlap of the location of the user and a building location for the building.

4. The device of claim 3, wherein the application is configured to perform operations further comprising:
detecting a mode of transportation for the user based on a speed, or a route of the user determined by one or more locations of the user detected by the device,
wherein the second weather condition represents an adverse change to the first weather condition based on the mode of transportation for the user.

5. The device of claim 4, wherein the mode of transportation comprises a public transportation mode, a ride sharing mode, a private vehicle mode, a bike mode, or a walk mode.

6. The device of claim 1, wherein the application is further configured to perform operations comprising a financial operation related to a financial account of the user, the financial account being managed by a financial institution.

7. The device of claim 1, wherein the first and second times are separated by a predetermined time interval.

8. The device of claim 7, wherein the predetermined time interval is about 30 minutes.

9. The device of claim 1, wherein the predicting the second weather condition comprises receiving the information from the server containing the second weather condition.

10. A computer-implemented method, the method comprising:
determining a first weather condition at a geographic location at a first time when a user of a device enters a building located within the geographic location;
based on information received by the device from a server, predicting a second weather condition at the geographic location at a second time while the user remains in the building; and
alerting the user of a change between the first and second weather conditions.

11. The method of claim 10, further comprising:
detecting a location of the user before the user enters the building; and
determining that the user enters the building based on an overlap of the location of the user and a building location for the building.

12. The method of claim 11, further comprising:
detecting a mode of transportation for the user based on a speed, or a route of the user determined by one or more locations of the user detected by the device,
wherein the second weather condition represents an adverse change to the first weather condition based on the mode of transportation for the user.

13. The method of claim 12, wherein the mode of transportation comprises a public transportation mode, a ride sharing mode, a private vehicle mode, a bike mode, or a walk mode.

14. The method of claim 10, further comprising:
performing a financial operation related to a financial account of the user, the financial account being managed by a financial institution.

15. The method of claim 10, wherein the first and second times are separated by a predetermined time interval.

16. The method of claim 10, wherein the predicting the second weather condition comprises receiving the information from the server containing the second weather condition.

17. A non-transitory computer-readable medium storing instructions, the instructions, when executed by a processor, cause the processor to perform operations comprising:
determining a first weather condition at a geographic location at a first time when a user of a device enters a building located within the geographic location;
based on information received by the device from a server, predicting a second weather condition at the geographic location at a second time while the user remains in the building; and
alerting the user of a change between the first and second weather conditions.

18. The non-transitory computer-readable medium of claim 17, the operations further comprising:
detecting a location of the user before the user enters the building; and
determining that the user enters the building based on an overlap of the location of the user and a building location for the building.

19. The non-transitory computer-readable medium of claim 18, the operations further comprising:
detecting a mode of transportation for the user based on a speed, or a route of the user determined by one or more locations of the user detected by the device,
wherein the second weather condition represents an adverse change to the first weather condition based on the mode of transportation for the user.

20. The non-transitory computer-readable medium of claim 17, the operations further comprising:
performing a financial operation related to a financial account of the user, the financial account being managed by a financial institution.

* * * * *